US009077525B2

(12) United States Patent
Chandran et al.

(10) Patent No.: US 9,077,525 B2
(45) Date of Patent: Jul. 7, 2015

(54) USER-CONTROLLED DATA ENCRYPTION WITH OBFUSCATED POLICY

(75) Inventors: Nishanth Chandran, Los Angeles, CA (US); Melissa E. Chase, Seattle, WA (US); Kristin Estella Lauter, Redmond, WA (US); Vinod Vaikuntanathan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 585 days.

(21) Appl. No.: 13/168,610

(22) Filed: Jun. 24, 2011

(65) Prior Publication Data

US 2012/0331283 A1 Dec. 27, 2012

(51) Int. Cl.
*H04L 29/06* (2006.01)
*H04L 9/08* (2006.01)
*H04L 29/08* (2006.01)
*H04L 12/24* (2006.01)
*H04L 9/30* (2006.01)
*G06F 11/34* (2006.01)

(52) U.S. Cl.
CPC ............ *H04L 9/088* (2013.01); *H04L 67/1008* (2013.01); *H04L 41/0896* (2013.01); *H04L 9/3013* (2013.01); *G06F 11/3447* (2013.01); *H04L 41/145* (2013.01); *H04L 9/3073* (2013.01); *H04L 2209/16* (2013.01); *H04L 2209/76* (2013.01); *H04L 2209/88* (2013.01)

(58) Field of Classification Search
CPC ............ H04L 41/145; H04L 67/1008; H04L 41/0896; H04L 9/3073; H04L 2209/76; H04L 9/3013; H04L 9/088; H04L 2209/16; H04L 2209/88; G06F 11/3447
USPC .................................................. 713/150, 153
See application file for complete search history.

(56) References Cited

U.S. PATENT DOCUMENTS

| 2006/0085454 | A1* | 4/2006 | Blegen et al. ................. 707/100 |
| 2008/0059787 | A1* | 3/2008 | Hohenberger et al. ....... 713/153 |
| 2009/0080658 | A1 | 3/2009 | Waters et al. |
| 2010/0030690 | A1 | 2/2010 | Herlitz |
| 2010/0211782 | A1 | 8/2010 | Auradkar et al. |
| 2010/0246827 | A1* | 9/2010 | Lauter et al. ................. 380/278 |

(Continued)

OTHER PUBLICATIONS

Yu, Shucheng. "Data Sharing on Untrusted Storage with Attribute-based Encryption." Pub. Date: Jul. 2010. pp. 1-161.*

(Continued)

*Primary Examiner* — Krista Zele
*Assistant Examiner* — James Forman
(74) *Attorney, Agent, or Firm* — Steve Wight; Judy Yee; Micky Minhas

(57) ABSTRACT

An obfuscated policy data encryption system and method for re-encrypting data to maintain the confidentiality and integrity of data about a user when the data is stored in a public cloud computing environment. The system and method allow a user to specify in a data-sharing policy who can obtain the data and how much of the data is available to them. This policy is obfuscated such that it is unintelligible to the cloud operator and others processing and storing the data. In some embodiments, a patient species with whom his health care data should be shared with and the encrypted health care data is stored in the cloud in an electronic medical records system. The obfuscated policy allows the electronic medial records system to dispense the health care data of the patient to those requesting the data without disclosing the details of the policy itself.

20 Claims, 7 Drawing Sheets

(56) References Cited

U.S. PATENT DOCUMENTS

| | | | |
|---|---|---|---|
| 2011/0258692 A1* | 10/2011 | Morrison et al. | 726/11 |
| 2012/0224692 A1* | 9/2012 | Karlov et al. | 380/255 |
| 2012/0239942 A1* | 9/2012 | Yan | 713/189 |
| 2012/0260094 A1* | 10/2012 | Asim et al. | 713/171 |
| 2012/0321086 A1* | 12/2012 | D'Souza et al. | 380/278 |

OTHER PUBLICATIONS

Kapadia, Apu, et al.,("Attribute-Based Publishing with Hidden Credentials and Hidden Policies", Proceedings of the Network and Distributed System Security Symposium, NDSS, Feb. 28-Mar. 2, 2007, pp. 1-14.*

Ibraimi et al. ("An Encryption Scheme for a Secure Policy Updating", Pub. Date: Jul. 2010, pp. 1-10.*

Bobba, et al., "PBES: A Policy Based Encryption System with Application to Data Sharing in the Power Grid", Asia CCS 2009 ACM Symposium on Information, Computer and Communications Security, Mar. 10-12, 2009, pp. 262-275.

Li, et al., "Policy-Hiding Access Control in Open Environment", ACM Symposium on Principles of Distributed Computing, Jul. 17-20, 2005, pp. 29-38.

Kapadia, et al., "Attribute-Based Publishing with Hidden Credentials and Hidden Policies", Proceedings of the Network and Distributed System Security Symposium, NDSS, Feb. 28-Mar. 2, 2007, pp. 14.

Kailasam, et al., "Arogyasree: An Enhanced Grid-Based Approach to Mobile Telemedicine", International Journal of Telemedicine and Applications, Feb. 18, 2010, pp. 1-11.

"Making Cloud Computing Secure for the Enterprise", White Paper, Retrieved Date: Mar. 29, 2011, pp. 14.

Akinyele, et al., "Self-protecting Electronic Medical Records using Attribute-based Encryption", 2010, pp. 1-20.

Benaloh, et al., "Patient Controlled Encryption: Ensuring Privacy of Electronic Medical Records", 16th ACM Conference on Computer and Communications Security, Nov. 9-13, 2009, pp. 12.

Kamara, et al., "Cryptographic Cloud Storage", Financial Cryptography and Data Security, FC 2010 Workshops, RLCPS, WESCR and WLC, Jan. 25-28, 2010, pp. 1-14.

Ateniese, et al., "Improved Proxy Re-encryption Schemes with Applications to Secure Distributed Storage", ACM Transactions on Information and System Security (TISSEC), vol. 09, No. 1, Feb. 2006, pp. 1-25.

Boneh, et al.. "Short Group Signatures", 2004, pp. 41-55.

Bitansky, et al., "On Strong Simulation and Composable Point Obfuscation", Jul. 25, 2010, pp. 33.

Barak, et al., "On the (Im)possibility of Obfuscating Programs", Proceedings of the 21st Annual International Cryptology Conference on Advances in Cryptology, 2001, pp. 18.

Canetti, Ran., "Towards Realizing Random Oracles: Hash Functions that Hide all Partial Information", 1997, pp. 455-469.

Canetti, et al., "Obfuscating Point Functions with Multibit Output", 2008, pp. 20.

Canetti, et al., "Obfuscation of Hyperplane Membership", Theory of Cryptography, 7th Theory of Cryptography Conference, TCC, Feb. 9-11, 2010, pp. 18.

Dodis, et al., "Correcting Errors without Leaking Partial Information", In 37th Annual ACM Symposium on Theory of Computing (STOC), 2005, pp. 10.

Gentry, Craig., "Fully Homomorphic Encryption using Ideal Lattices", Symposium on Theory of Computing Conference, May 31-Jun. 2, 2009, pp. 169-178.

Goldwasser, et al., "On the Impossibility of Obfuscation with Auxiliary Input", 46th Annual IEEE Symposium on Foundations of Computer Science (FOCS), Oct. 23-25, 2005, pp. 10.

Goyal, et al., "Attribute-based Encryption for Fine-grained Access Control of Encrypted Data", 13th ACM Conference on Computer and Communications Security, Oct. 30-Nov. 3, 2006, pp. 89-98.

Hada, Satoshi., "Secure Obfuscation for Encrypted Signatures", Eurocrypt, May 31, 2010, pp. 1-20.

Hofheinz, et al., "Obfuscation for Cryptographic Purposes", Journal of Cryptology, vol. 23, No. 2, Jan. 2010, pp. 1-19.

Hohenberger, et al., "Securely Obfuscating Re-encryption", Theory of Cryptography Conference TCC, 2007, pp. 20.

Katz, et al., "Predicate Encryption Supporting Disjunctions, Polynomial Equations, and Inner Products", Advances in Cryptology—EUROCRYPT 2008, 27th Annual International Conference on the Theory and Applications of Cryptographic Techniques, Apr. 13-17, 2008, pp. 17.

Lynn, et al., "Positive Results and Techniques for Obfuscation", In EUROCRYPT, 2004, pp. 20.

Scott, Michael., "Authenticated ID-based Key Exchange and Remote Log-in with Insecure Token and PIN Number", 2002, pp. 1-9.

Shen, et al., "Predicate Privacy in Encryption Systems", Proceedings of the 6th Theory of Cryptography Conference on Theory of Cryptography, 2009, pp. 18.

Sahai, et al., "Fuzzy Identity-based Encryption", 2004, pp. 17.

Verheul, Eric R., "Evidence that XTR is More Secure than Supersingular Elliptic Curve Cryptosystems", Journal of Cryptology, vol. 17, No. 4, Sep. 2004, pp. 1-21.

Wee, Hoeteck., "On Obfuscating Point Functions", Symposium on Theory of Computing Conference, May 22-24, 2005, pp. 10.

Narayan, S., Gagne, M., Safavi-Naini, R., "Preserving EHR System Using Attribute-based Infrastructure," CCSW10 ACM Cloud Computing Security Workshop.CCSW10, Oct. 8, 2010, Chicago, Illinois, pp. 47-52.

Adida et al., "How to Shuffle in Public", Theory of Cryptography: Lecture Notes in Computer Science, vol. 4392, 2007, pp. 555-574.

Blaze et al., "Divertible Protocols and Atomic Proxy Cryptography", Advances in Cryptography—EUROCRYPT '98: Lecture Notes in Computer Science, vol. 1403, 1998, pp. 127-144.

Chandran et al., "Collusion Resistant Obfuscation and Functional Re-Encryption", IACR E-Print, Retrieved from: <<http://eprint.iacr.org/2011/337.pdf>>, Jun. 22, 2011.

Groth et al., "Efficient Non-Interactive Proof Systems for Bilinear Groups", Advances in Cryptology—EUROCRYPT 2008—Lecture Notes in Computer Science, vol. 4965, 2008, pp. 415-432.

Rivest et al., "On Data Banks and Privacy Homomorphisms", Foundations of Secure Computations, 1978, pp. 457-473.

Ateniese et al., "Provable Data Possession at Untrusted Stores," Proceedings of the 14th ACM Conference on Computer and Communications Security, 2007, pp. 598-609.

Ateniese et al., "Proofs of Storage from Homomorphic Identification Protocols," Advances in Cryptology—Asiacrypt '09—Lecture Notes in Computer Science, vol. 5912, 2009, pp. 319-333.

Ateniese et al., "Scalable and Efficient Provable Data Possession," Proceedings of the Fourth International Conference on Security and Privacy in Communication Networks, 2008, pp. 1-10.

Baek et al., "On the Integration of Public Key Data Encryption and Public Key Encryption with Keyword Search," Information Security—Lecture Notes in Computer Science, vol. 4176, 2006, pp. 217-232.

Baek et al., "Public Key Encryption with Keyword Search Revisited," Proceedings of the International Conference on Computational Science and It's Applications, Part 1, pp. 1249-1259.

Bardin et al., "Security Guidance for Critical Areas of Focus in Cloud Computing," Cloud Security Alliance Technical Report, Apr. 2009.

Bellare et al., "Deterministic and Efficiently Searchable Encryption," Advances in Cryptology—CRYPTO '07—Lecture Notes in Computer Science, vol. 4622, 2007, pp. 535-552.

Bethencourt et al., "Ciphertext-Policy Attribute-Based Encryption," Proceedings of the IEEE Symposium on Security and Privacy, 2007, pp. 321-334.

Boneh et al., "Public Key Encryption with Keyword Search," Advances in Cryptology—Eurocrypt '04—Lecture Notes in Computer Science, vol. 3027, 2004, pp. 506-522.

Boneh et al., "Public-Key Encryption That Allows PIR Queries," Advances in Cryptology—Eurocrypt '07—Lecture Notes in Computer Science, vol. 4622, 2007, pp. 50-67.

Boneh et al., "Conjunctive, Subset, and Range Queries on Encrypted Data," Proceedings of the Theory of Cryptography Conference—Lecture Notes in Computer Science, vol. 4392, 2007, pp. 535-554.

(56) References Cited

OTHER PUBLICATIONS

Bowers et al., "Proofs of Retrievability: Theory and Implementation," Cryptology ePrint Archive—Technical Report 2008/175, 2008.

Byun et al., "Off-Line Keyword Guessing Attacks on Recent Keyword Search Schemes Over Encrypted Data," Secure Data Management—Lecture Notes in Computer Science, vol. 4165, 2006, pp. 75-83.

Chang et al., "Privacy Preserving Keyword Searches on Remote Encrypted Data," Applied Cryptography and Network Security—Lecture Notes in Computer Science, vol. 3531, 2005, pp. 442-455.

Chase, Melissa, "Multi-Authority Attribute Based Encryption," Proceedings of the Theory of Cryptography Conference—Lecture Notes in Computer Science, vol. 4392, 2007, pp. 515-534.

Chase et al., "Improving Privacy and Security in Multi-Authority Attribute-Based Encryption," Proceedings of the Sixteenth ACM Conference on Computer and Communications Security, 2009, pp. 121-130.

Dodis et al., "Proofs of Retrievability via Hardness Amplification," Proceedings of the Theory of Cryptography Conference—Lecture Notes in Computer Science, vol. 5444, 2009, pp. 109-127.

Erway et al., "Dynamic Provable Data Possession," Proceedings of the 16th ACM Conference on Computer and Communications, 2009, pp. 213-222.

Fuhr et al., "Decryptable Searchable Encryption," Proceedings of the International Conference on Provable Security—Lecture Notes on Computer Science, 2007, pp. 228-236.

Goh, Eu-Jin, "How to Search Efficiently on Encrypted Compressed Data," Cryptology ePrint Archive Technical Report 2003/216, Oct. 7, 2003.

Goh, Eu-Jin., "Secure Indexes," Cryptology ePrint Archive Technical Report 2003/216, Mar. 16, 2004.

Golle et al., "Secure Conjunctive Keyword Search Over Encrypted Data," Proceedings of the Applied Cryptology and Network Security Conference—Lecture Notes in Computer Science, vol. 3089, 2004, pp. 31-45.

Juels et al., "PORs: Proofs of Retrievability for Large Files," Proceedings of the 14th ACM Conference on Computer and Communication Security, 2007, pp. 584-597.

Ostrovsky et al., "Attribute-Based Encryption with Non-Monotonic Access Structures," Proceedings of the 14th ACM Conference on Computer and Communication Security, 2007, pp. 195-203.

Park et al., "Public Key Encryption With Conjunctive Field Key Encryption," Proceedings of the Workshop on Information Security Applications—Lecture Notes in Computer Science, vol. 3325, 2004, pp. 73-86.

Shacham et al., "Compact Proofs of Retrievability," Proceedings of the International Conference on Advances in Cryptology—Asiacrypt '08—Lecture Notes in Computer Science, vol. 5350, 2008, pp. 90-107.

Shi et al., "Multi-Dimensional Range Query Over Encrypted Data," Proceedings of the IEEE Symposium on Security and Privacy, 2007, pp. 350-364.

Song et al., "Practical Techniques for Searching on Encrypted Data," Proceedings of the IEEE Symposium on Research in Security and Privacy, 2000, pp. 44-55.

Wang et al., "Enabling Public Verifiability and Data Dynamics for Storage Security in Cloud Computing," Proceedings of the European Symposium on Research in Computer Security—Lecture Notes in Computer Science, vol. 5789, 2009, pp. 355-370.

Zetter, Kim, "Compay Caught in Texas Data Center Raid Loses Suit Against FBI," Wired Magazine, Apr. 8, 2009.

Abdalla et al., "Searchable Encryption Revisited: Consistency Properties, Relation to Anonymous IBE, and Extensions,", Journal of Cryptography, vol. 21, Issue 3, pp. 350-391, Mar. 2008.

Akl et al., "Cryptographic Solution to a Problem of Access Control in a Hierarchy," ACM Transactions on Computer Systems, vol. 1, Issue 3, pp. 239-248, Aug. 1983.

Atallah et al., "Dynamic and Efficient Key Management for Access Hierarchies," ACM Transactions on Information and System Security, vol. 12, Issue 3, Article 18, Jan. 2009, pp. 1-43.

Benaloh, Josh, "Key Compression and Its Application to Digital Fingerprinting," Microsoft Research Technical Report, Apr. 13, 2001.

Blaze, Matt, "A Cryptographic File System for UNIX," Proceedings of the First ACM Conference on Computer and Communications Security, pp. 9-16, 1993.

Canetti et al., "Chosen-Ciphertext Security from Identity-Based Encryption," Advances in Cryptology—Eurocrypt 2004—Lecture Notes in Computer Science, vol. 3027, pp. 207-222, 2004.

Curtmola et al., "Searchable Symmetric Encryption: Improved Definition and Efficient Constructions," Proceedings of the Thirteenth ACM Conference on Computer and Communications Security, pp. 79-88, 2006.

De Capitani Di Vimercati et al, "Over-Encryption: Management of Access Control Evolution on Outsourced Data," Proceeding of the 33rd International Conference on Very Large Databases, pp. 123-134, 2007.

Fu, Kevin, "Group Sharing and Random Access in Cryptographic Storage File Systems," Master's Thesis, Massachusetts Institute of Technology, Jun. 1999.

Gentry et al., "Hierarchical ID-Based Cryptography," Advances in Cryptology—ASIACRYPT 2002—Lecture Notes in Computer Science, vol. 2501, pp. 548-566, 2002.

Hengartner et al., "Exploiting Hierarchical Identity-Based Encryption for Access Control to Pervasive Computing Information," Proceedings of the First IEEE Conference on Security and Privacy for Emerging Areas in Communications Networks, pp. 384-396, 2005.

Miklau et al., "Controlling Access to Published Data Using Cryptography," Proceedings of the 29th International Conference on Very Large Data Bases, pp. 898-909, 2003.

Sandhu, Ravi S., "Cryptographic Implementation of a Tree Hierarchy for Access Control," Information Processing Letters vol. 27, Issue 2, pp. 95-98, 1988.

Shamir, Adi, "On the Generation of Cryptographically Strong Pseudorandom Sequences," ACM Transactions on Computer Systems, vol. 1, pp. 38-44, 1983.

Shamir, Adi, "Identity-Based Cryptosystems and Signature Schemes," Advances in Cryptology—Crypto '84—Lecture Notes in Computer Science, pp. 47-53, 1985.

\* cited by examiner

USER-CONTROLLED DATA ENCRYPTION WITH OBFUSCATED POLICY

BACKGROUND

One major barrier to adoption of cloud services and storage is concern over privacy and security issues. In other words, the concern is about maintaining the confidentiality and the integrity of private data when that data is being stored in a public cloud. For example, unless they choose to host their own private cloud, hospitals and medical practitioners face the challenge of outsourcing the storage and handling of their patients' data in a private, reliable, and secure way that complies with government regulations for handling sensitive data and protecting privacy.

At least one existing architecture uses cryptographic cloud storage to address this problem. This architecture uses existing and emerging cryptographic building blocks such a searchable encryption, attribute-based encryption (ABE), and proofs of storage. In an ABE-based approach, the owner of the data can give each potential recipient a decryption key that allows them to decrypt only those documents that satisfy a given policy. However, this technique has several disadvantages including that changing the access policy requires distributing new keys to all affected recipients, and revoking access rights requires changing the master key and downloading and re-encrypting all messages.

Using ABE is essentially a way to do key management by outsourcing key management to the cloud according to a pre-specified policy for handling of encrypted data. The policy specification itself is not private though. This policy may contain sensitive information that would then leak information about the data once the policy is known. This is undesirable in some application. For example, imagine a scenario whereby a company or an individual wishes to set up private policy for how to handle its sensitive data. This policy would determine the parties that would read the data, such that leaking the policy would reveal information about the parties, the type of data, and the preferences of the data owner.

Some approaches have the server implement the access policy, and then translate incoming ciphertexts into ciphertexts readable by the recipients. Of course, this should be done without allowing the server to actually decrypt any ciphertexts. This is called proxy re-encryption, which allows a server to translate messages intended for the data owner into messages intended for a given recipient. Proxy re-encryption has two problems, however. First, it is not possible to choose an appropriate recipient based on the encrypted message. Second, it is not possible to do this without revealing the access policy to the server.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the obfuscated policy data encryption system and method that allows for securely obfuscating functional re-encryption. Embodiments of the system and method allow a data owner (also called a user) to specify a data-sharing procedure or policy that dictates how and to whom the data may be distributed. A private version of this data-sharing policy is generated to obtain an obfuscated policy.

Embodiments of the system and method store the data in a public cloud computing environment. A cloud data management system residing on the cloud receives encrypted data from a data provider and then re-encrypts encrypted data according to the obfuscated policy. All the while, the policy remains unintelligible to the cloud.

A data consumer that desires access to the data can request the re-encrypted data from the cloud data management system as long as the user has given access privileges to the data consumer. Upon receiving the request, the cloud data management system sends the data consumer the requested data. The data consumer then uses a data consumer public key to decrypt and view the data.

In some embodiments, the system and method can be used to facilitate private handling of sensitive personal medical data. A patient using an electronic medical records (EMR) system built on embodiments of the system and method can specify a policy for access to portions of her encrypted records by various health care providers according to their role, specialty, or identity. The EMR system, which resides on the cloud, handles the uploading, re-encrypting, and accessing of the files, without learning anything about the policy or preferences according to which the data is being redistributed.

A patient can set their policy preferences so that when doctors or clinics upload encrypted, privately-indexed records for the patient, other providers, specialists, or family members registered with the system can access only those records to which the patient has allowed them access. In other embodiments, selective use is allowed of anonymized versions of patients' records for medical research purposes. The EMR system could allow access by researchers who are registered users. Patients could include in their policy specification which portions of their records should be made available for medical research, perhaps of a specific nature such as cancer research, and those portions of the record would not contain personally identifiable information.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of a obfuscated policy data encryption system and method reference is made to the accompanying drawings, which form a part thereof, and in which is shown by way of illustration a specific example whereby embodiments of the obfuscated policy data encryption system and method may be practiced. It is to be understood that other embodiments may be utilized and structural changes may be made without departing from the scope of the claimed subject matter.

I. System Overview

Embodiments of the obfuscated policy data encryption system and method hide from others a policy set forth by a user to encrypt and distribute data about the user. This allows only those entities that the user specifies to view the data without letting those entities or any other intermediaries handling the data the details of the policy. Moreover, the user can specify how much of the data that each entity has access to view.

Figure 1:
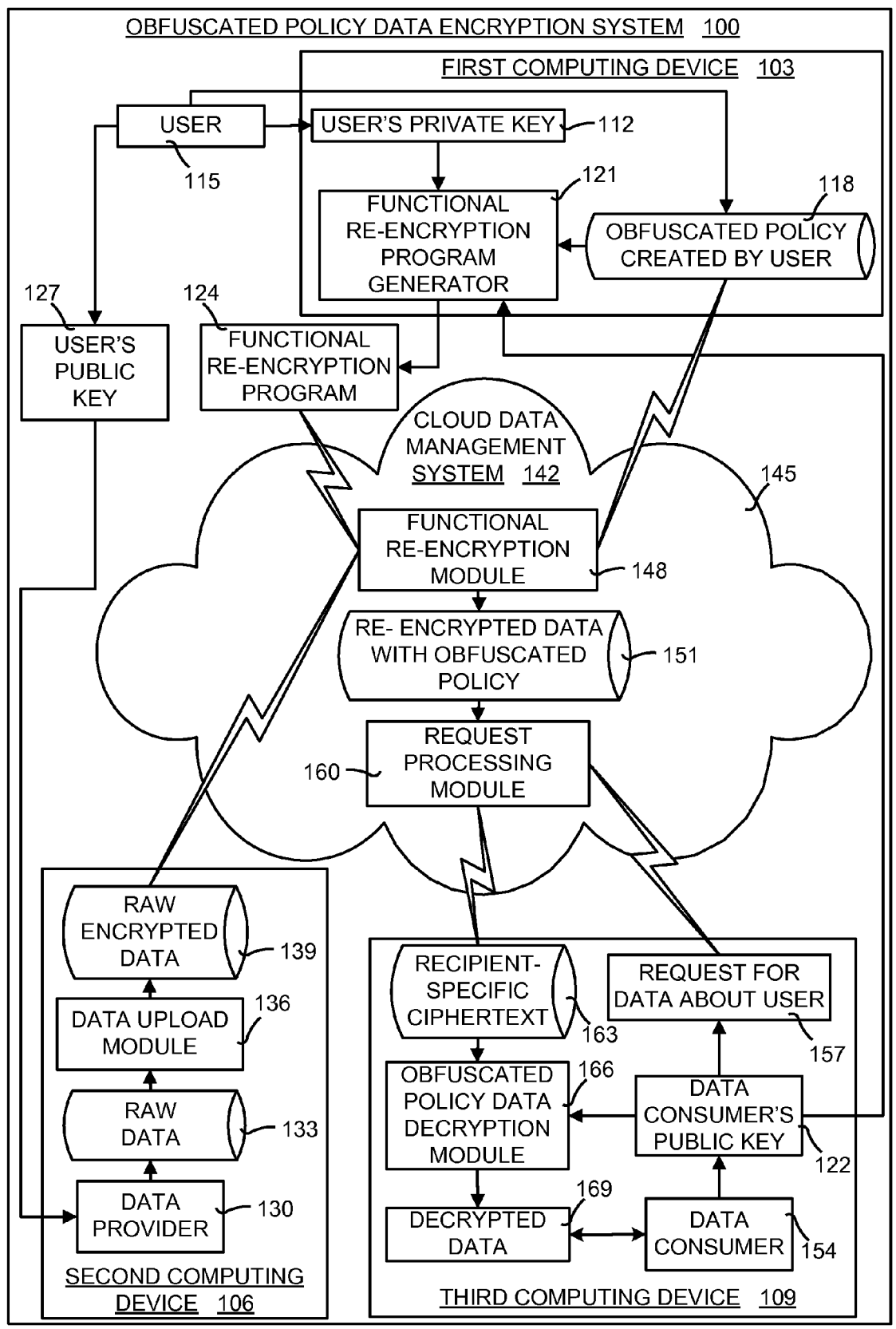
FIG. 1 is a block diagram illustrating a general overview of embodiments of the obfuscated policy data encryption system and method implemented in a computing environment.

FIG. 1 is a block diagram illustrating a general overview of embodiments of the obfuscated policy data encryption system 100 and method implemented in a computing environment. In particular, embodiments of the obfuscated policy data encryption system 100 and method are shown implemented on a plurality of computing devices. Shown in FIG. 1 are a first computing device 103, a second computing device 106, and a third computing device 109. This computing devices 103, 106, 109 may be virtually any device that contains a processor, such as a desktop computer, notebook computer, and mobile phone. Moreover, although three computing devices are shown in FIG. 1, it should be appreciated that there may be more or fewer computing devices that are used in various embodiments.

Embodiments of the obfuscated policy data encryption system 100 and method include a user's private key 112 that is used by a user 115 to generate a data-sharing policy (not shown). The user 115 then uses the first computing device 103 to generate an obfuscated policy 118 from the data-sharing policy. The obfuscated policy 118 is a private version of the data-sharing policy.

The first computing device 103 also contains a functional re-encryption program generator 121 that generates a functional (or obfuscated) re-encryption program 124. The functional re-encryption program generator 121 uses the user's private key 112, the obfuscated policy 118, and a data consumer's public key 122 to generate the functional re-encryption program 124. The mathematical details of the program 124 are discussed in detail below. Moreover, it should noted that there may be more than one data consumer's public key, and they may come from a variety of data consumers. Typically, these data consumers are those entities that the user 115 gives access to the data about the user, as set forth in the data-sharing policy.

The second computing device 106 receives from the user 115 a user's public key 127. The user's public key 127 is used by a data provider 130 to encrypt data about the user 115. In particular, raw data 133 about the user 115 is encrypted by a data upload module 136 on the second computing device 106 to generated raw encrypted data 139. As used in this document, the data provider 130 is an entity (such as a person or a corporation) that gathers and provides data about the user 115.

The functional re-encryption program 124 is sent to a cloud data management system 142 that resides in a public cloud computing environment 145. The cloud data management system 142 includes a functional re-encryption module 148 that receives the raw encrypted data 139 sent by the data provider 130. The functional re-encryption module uses the functional re-encryption program 124 to re-encrypt the raw encrypted data 139 in accordance with the obfuscated policy 118. This generates re-encrypted data 151 with an obfuscated policy. The data-sharing policy set forth by the user 115 is kept hidden from the cloud data management system 142 at all times, even when it is processing data.

The third computing device 109 is used by a data consumer 154 to request data about the user. As used in this document, the data consumer 154 refers to an entity that desires to obtain data about the user 115. This data typically is stored in the public cloud computing environment 145. It should be noted that is some embodiments of the obfuscated policy data encryption system 100 and method, the data provider 130 and the data consumer 154 may be one in the same. This may occur, for example, when an entity (acting as a data provider 130) uploads some data about the user 115 to the public cloud computing environment 145 and also requests data (now acting as a data consumer 154) about the user from the cloud data management system 142.

The data consumer 154 uses the data consumer's public key 122 to issue a request 157 for data about the user 115. This request 157 is sent to the cloud data management system 142 and then processed by a request processing module 160. The request processing module 160 outputs recipient-specific ciphertext 163 that can only be decrypted by the data consumer's public key. The request processing module 160 uses the obfuscated policy to determine whether an entity requesting data has been given access to the data by the user 115 and how much of the data can be viewed.

The data consumer 154 uses an obfuscated policy data decryption module 166 on the third computing device 109 to decrypt the recipient-specific ciphertext 163. The output of the module 166 is decrypted data 169. This decrypted data 169 is displayed to the data consumer 154 to fulfill the request 157.

II. Operational Overview

Figure 2:
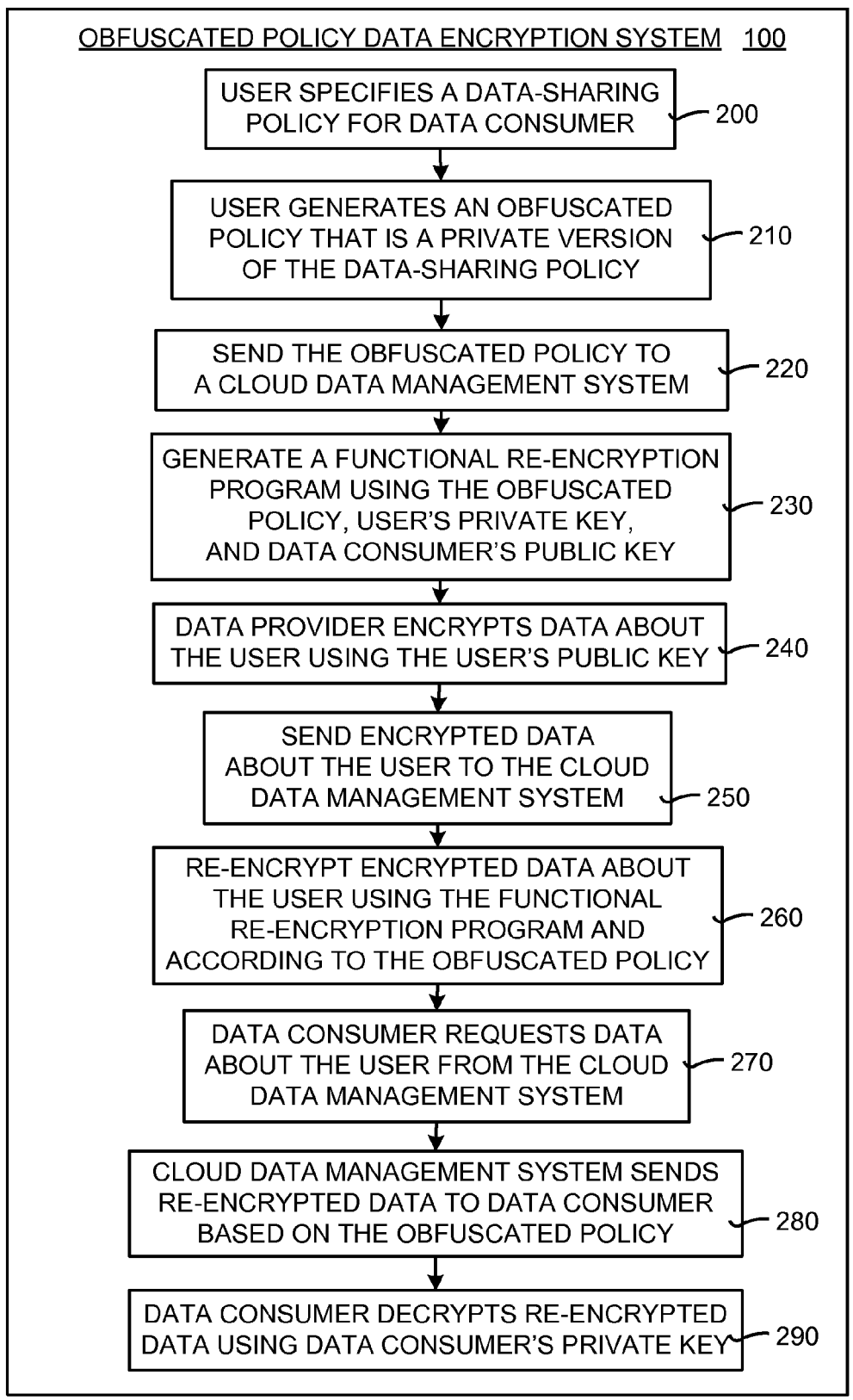
FIG. 2 is a flow diagram illustrating the general operation of embodiments of the obfuscated policy data encryption system and method shown in FIG. 1.

FIG. 2 is a flow diagram illustrating the general operation of embodiments of the obfuscated policy data encryption system 100 and method shown in FIG. 1. As shown in FIG. 2, the operation of embodiments of the obfuscated policy data encryption method begins by having the user specify a data-sharing policy for one or more data consumers (box 200). The user then generates an obfuscated policy that is a private version of the data-sharing policy (box 210). The obfuscated policy ensures that only the user will know the full details of the data-sharing policy.

Embodiments of the obfuscated policy data encryption method then send the obfuscated policy to the cloud data management system that resides in the public cloud computing environment (box 220). Moreover, embodiments of the method generate a functional re-encryption program for later use in re-encrypting data about the user (box 230). The functional re-encryption program is generated using the obfuscated policy, the user's private key, and the data consumer's public key.

Meanwhile, a data provider encrypts data about the user by using the user's public key (box 240). This encrypted data about the user is sent to the cloud data management system (box 250). The cloud data management system then re-encrypts the encrypted data about the user (box 260). This is performed using the functional re-encryption program and according to the obfuscated policy. The re-encrypted data about the user is stored in the public cloud computing environment.

When a data consumer desires to obtain data about the user, the data consumer makes a requests to obtain the data from the cloud data management system (box 270). The cloud data management system processes the request and sends the re-encrypted data to the data consumer (box 280). This request is sent in accordance with the data-sharing policy hidden within the obfuscated policy. The data consumer receives the requested data and decrypts the data using the data consumer's private key (box 290).

III. Operational Details

The operational details of embodiments of the obfuscated policy data encryption system 100 and method will now be discussed. This includes the operation of the functional re-encryption program generator 121, the functional re-encryption module 148, the request processing module 160, and the obfuscated policy data decryption module 166. Finally, the mathematical details of the functional re-encryption program 124 used to re-encrypt the data in accordance with the obfuscated policy will be presented.

III.A. Functional Re-Encryption Program Generator

Figure 3:
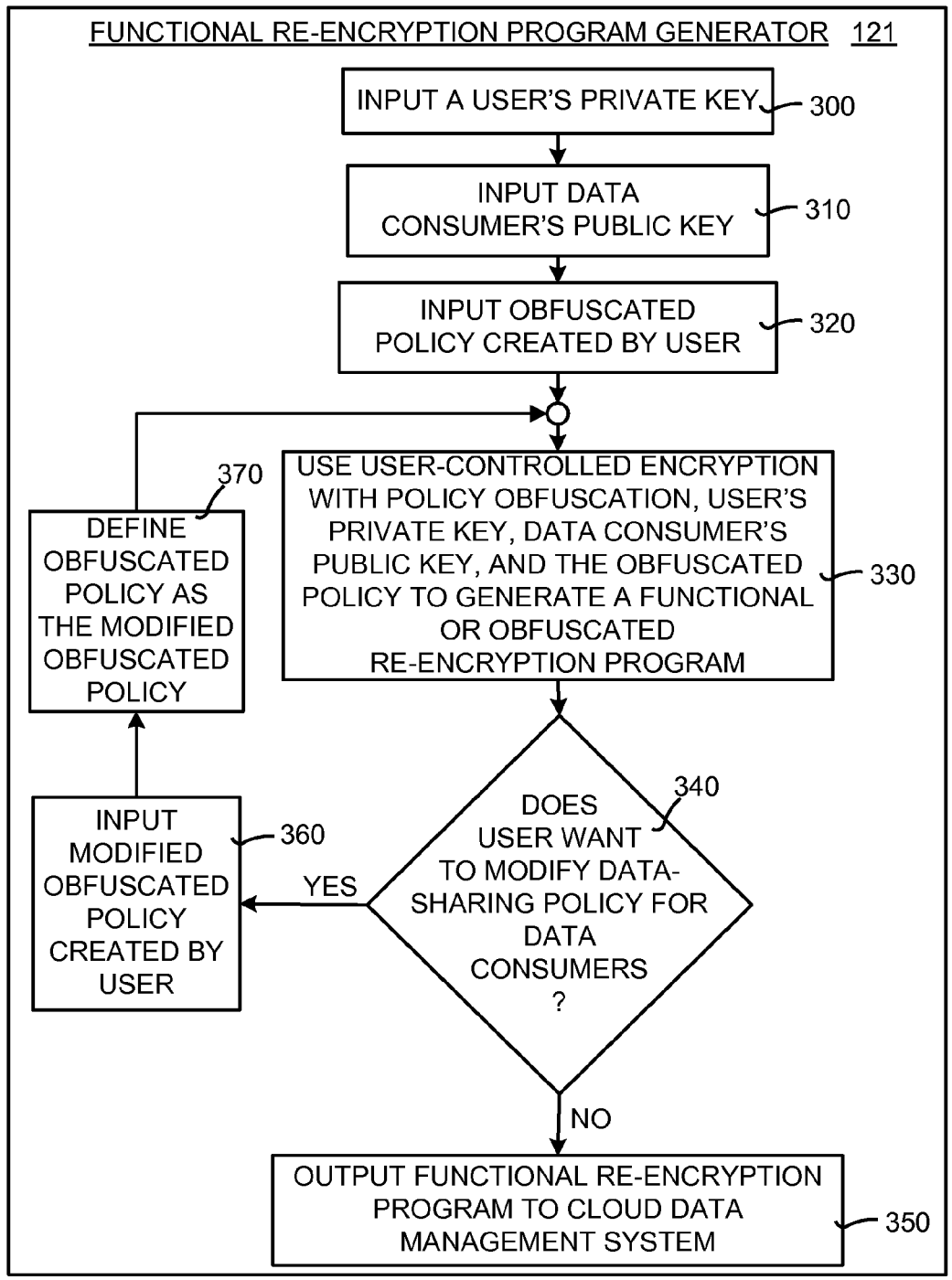
FIG. 3 is a flow diagram illustrating the operational details of embodiments of the functional re-encryption program generator shown in FIG. 1.

FIG. 3 is a flow diagram illustrating the operational details of embodiments of the functional re-encryption program generator 121 shown in FIG. 1. As shown in FIG. 3, operation of the generator 121 begins by inputting the user's private key (box 300), inputting the data consumer's public key (box 310), and inputting the obfuscated policy created by the user (box 320). It should be noted that public keys from more than one data consumer may be used by the generator 121. In some embodiments of the generator 121, a public key is used for each data consumer that the user has allowed to access to the data as set forth in the data-sharing policy.

The generator 121 then generates the functional re-encryption program (box 330). The mathematical details of this process are given in detail below. In general, the generator 121 uses the user's private key, the data consumer's public key, and the obfuscated policy to generate the functional re-encryption program.

A determination then is made as to whether the user wants to modify the data-sharing policy for data consumer (box 340). If not, then the functional re-encryption program is output to the cloud data management system (box 350). If the user wants to change the data-sharing policy, then the generator 121 inputs a modified obfuscated policy that was created by the user (box 360). This modified obfuscated policy then is set as the current obfuscated policy (box 370). A replacement functional re-encryption program then is generated based on the updated obfuscated policy.

III.B. Functional Re-Encryption Module

Figure 4:
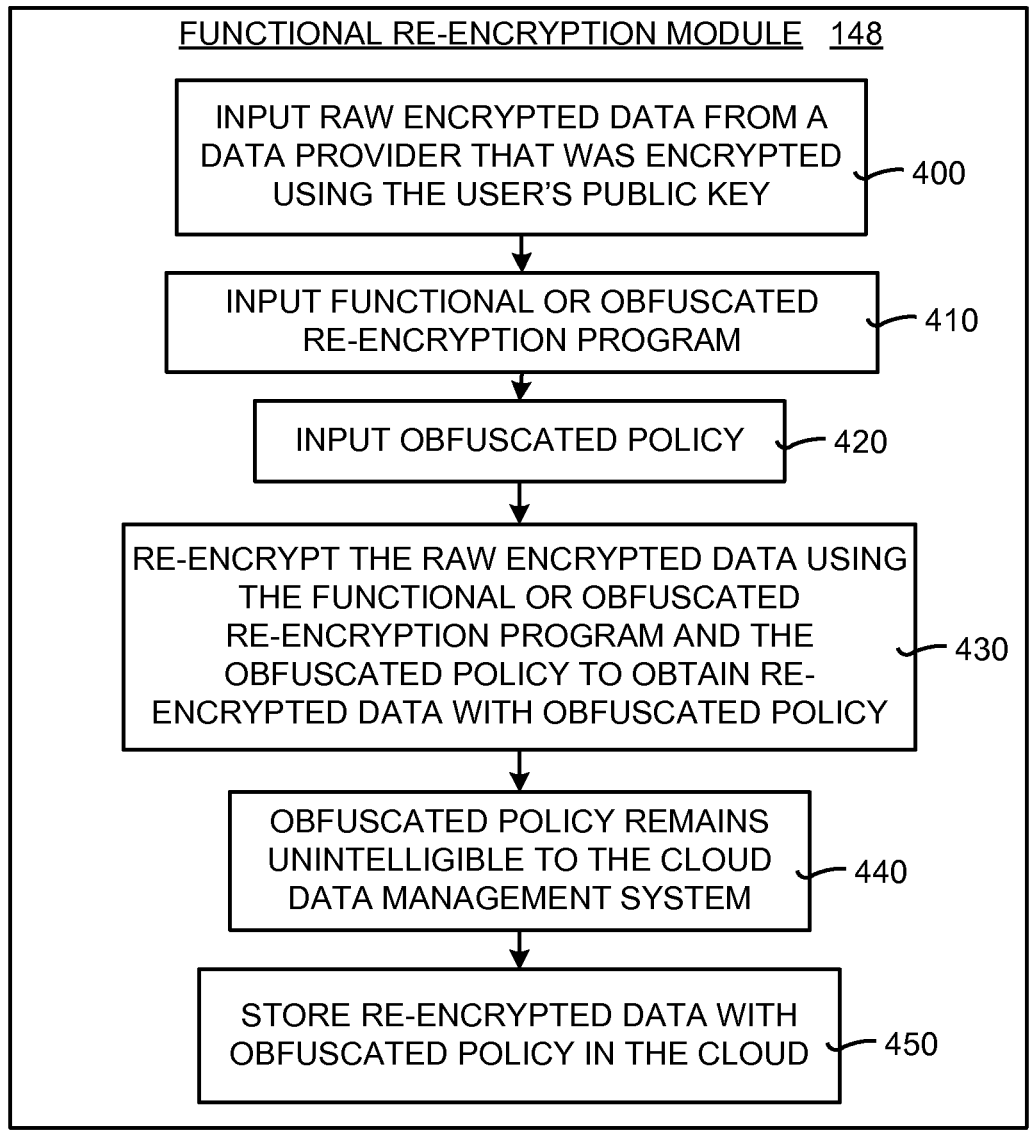
FIG. 4 is a flow diagram illustrating the operational details of embodiments of the functional re-encryption module shown in FIG. 1.

FIG. 4 is a flow diagram illustrating the operational details of embodiments of the functional re-encryption module 148 shown in FIG. 1. The functional re-encryption module 148 resides on the cloud data management system 142. As shown in FIG. 4, the operation of the module 148 begins by inputting raw encrypted data received from the data provider (box 400). As discussed above, this raw encrypted data was previously encrypted by the data provider using the user's public key.

The module 148 also inputs the functional (or obfuscated) re-encryption program (box 410) and the obfuscated policy (box 420). The module 148 then re-encrypts the raw encrypted data using the functional (or obfuscated) re-encryption program and the obfuscated policy (box 430). The result is re-encrypted data with obfuscated policy.

The obfuscated policy remains unintelligible to the cloud data management system (box 440). More specifically, the data-sharing policy authored by the user remains unknown to the cloud data management system because of the obfuscated policy. The data-sharing policy is contained in the obfuscated policy such that the details of the data-sharing policy cannot be known by the system. The re-encrypted data with obfuscated policy then is stored in the public cloud computing environment (box 450).

III.C. Request Processing Module

Figure 5:
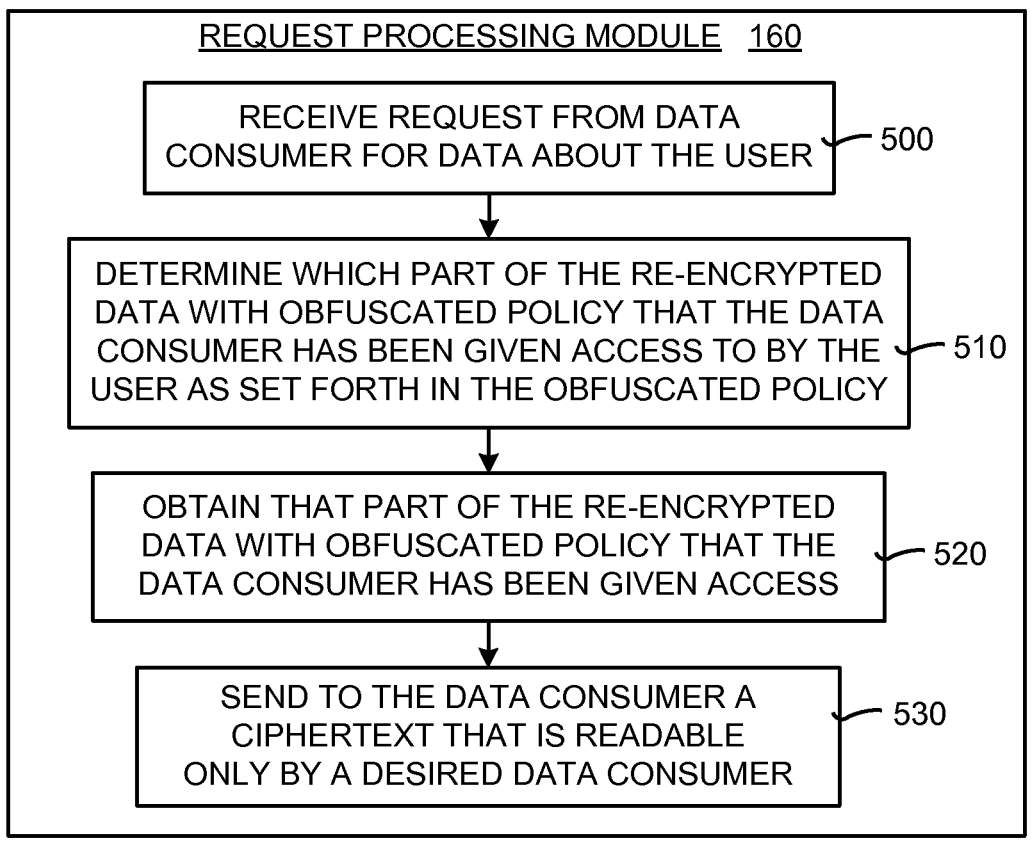
FIG. 5 is a flow diagram illustrating the operational details of embodiments of the request processing module shown in FIG. 1.

FIG. 5 is a flow diagram illustrating the operational details of embodiments of the request processing module 160 shown in FIG. 1. The request processing module 160 also resides on the cloud data management system 142. As shown in FIG. 5, the operation of the module 160 begins by receiving a request for data about the user from a data consumer (box 500).

The module 160 then determines which part of the stored re-encrypted data that the data consumer is allowed to access (box 510). This is done by consulting the obfuscated policy. However, at all times the details of the obfuscated policy remains a mystery to the cloud data management system 142.

The module 160 then obtains that part of the re-encrypted data that the data consumer has been given access (box 520). In some cases this may be all of the data, if the user has given the data consumer such access in the data-sharing policy. The module 160 then sends a ciphertext to the data consumer that is readable only by the desired data consumer (as desired by the user) (box 530). In general, ciphertext is an encryption performed on text using a cipher technique. It is unreadable by those without the cipher to be able to decrypt it. This recipient-specific ciphertext is readable only by the requesting data consumer.

III.D. Obfuscated Policy Data Decryption Module

Figure 6:
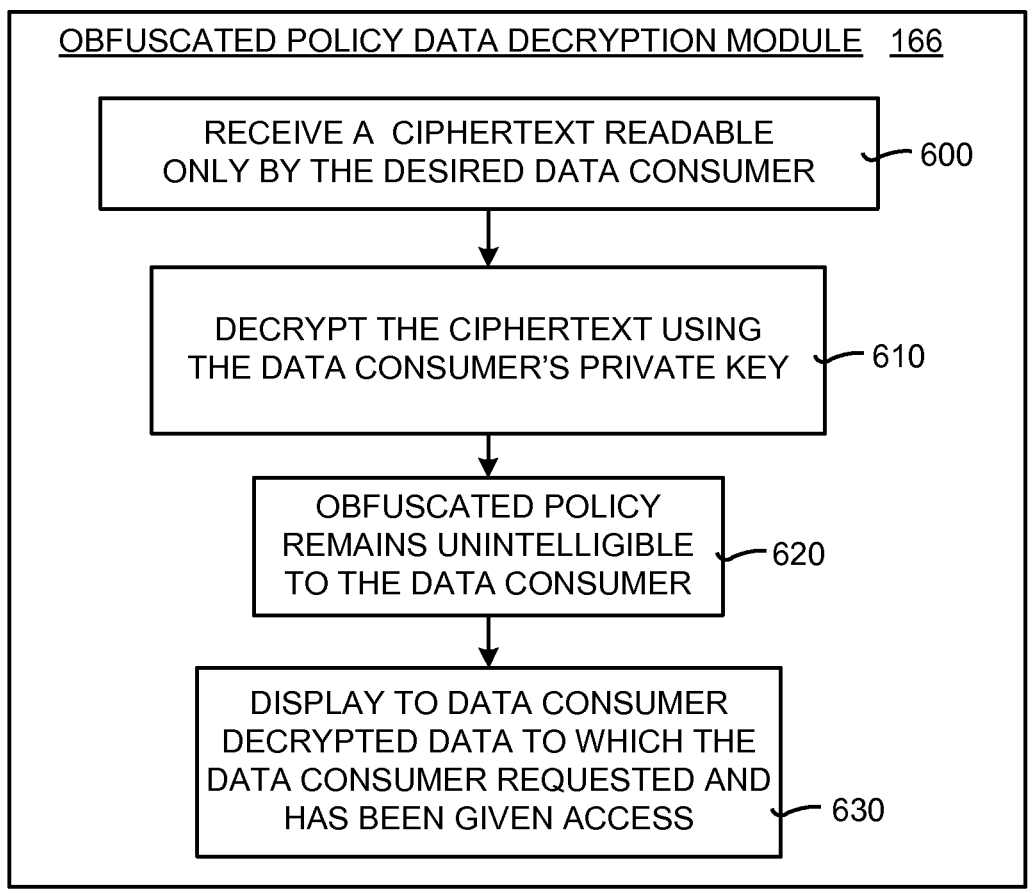
FIG. 6 is a flow diagram illustrating the operational details of embodiments of the obfuscated policy data decryption module shown in FIG. 1.

FIG. 6 is a flow diagram illustrating the operational details of embodiments of the obfuscated policy data decryption module 166 shown in FIG. 1. The obfuscated policy data decryption module 166 resides on the third computing device 109, shown in FIG. 1. Referring now to FIG. 6, the operation of the module 166 begins by receiving the ciphertext that is readable only by the desired data consumer (box 600).

The module 166 then decrypts the ciphertext using the data consumer's private key (box 610). Throughout the decryption process the obfuscated policy remains unintelligible to the data consumer and the module 166 (box 620). The module 166 then displays to the data consumer the decrypted data (box 630). It should be noted that this data decrypted and displayed to the user is only that data to which the data consumer has requested and been given access.

III.E. Mathematical Details of the Functional Re-Encryption Program

The functional (or obfuscated) re-encryption program is used to both re-encrypt data about the user (using the obfuscated policy) and to decrypt the re-encrypted data. Following are the mathematical details of the functional re-encryption program.

III.E.1. Preliminaries

Define $\lambda$ as a security parameter. The term neg($\lambda$) denotes some negligible function. Namely, for all c>0 and all sufficiently large $\lambda$, let $\mu(\lambda)<1/\lambda^c$. For two distributions, $D_1$ and $D_2$, $D_1 \overset{c}{\approx} D_2$ means that they are computationally indistinguishable. To be precise, this statement holds for ensembles of distributions.

Let [l] denote the set $\{1, \ldots, l\}$. Vectors are denoted by bold-face letters, such as a. Let $\mathbb{G}$ be a group of prime order q. For a vector, $$a=(a_1, a_2, \ldots, a_l) \in \mathbb{Z}_q^l$$

and group element $g \in \mathbb{G}$, $g^a$ is written to mean the vector, $(g^{a_1}, g^{a_2}, \ldots, g^{a_l})$.

For two vectors a and b, where a and b are either both in $\mathbb{Z}_q^l$ or both in $\mathbb{G}^l$, it is written ab to denote their component-wise product and a/b to denote their component-wise division. In case $b \in \mathbb{Z}_q^l$, term $a^b$ denotes their component-wise exponentiation. For a vector a and scalar x, xa=ab, a/x=a/b, and $a^x=a^b$, where b=(x, x, $\cdots$, x) of dimension l.

Assume the existence of families of groups, $$\{\mathbb{G}^{(\lambda)}\}_{\lambda>0}, \{\mathbb{H}^{(\lambda)}\}_{\lambda>0} \text{ and } \{\mathbb{G}_T^{(\lambda)}\}_{\lambda>0}$$

with prime order $q=q(\lambda)$, endowed with a bilinear map, $$e_\lambda: \mathbb{G}^{(\lambda)} \times \mathbb{H}^{(\lambda)} \to \mathbb{G}_T^{(\lambda)}.$$

When clear from the context, the superscript that refers to the security parameter is omitted from all these quantities. The mapping is efficiently computable, and is bilinear. Namely, for any generators $g \in \mathbb{G}$ and $h \in \mathbb{H}$, and, $$a, b \in \mathbb{Z}_q, e(g^a, h^b) = e(g, h)^{ab},$$

It is also required that the bilinear map is non-degenerate, in the sense that if $g \in \mathbb{G}$, $h \in \mathbb{H}$ generate $\mathbb{G}$ and $\mathbb{H}$ respectively, the $e(g,h) \neq 1$.

Assume also that the Symmetric External Diffie-Hellman Assumption (SXDH) holds. The SXDH says that the decisional Diffie-Hellman (DDH) problem is hard in both of the groups $\mathbb{G}$ or $\mathbb{H}$. In other words, the following two ensembles are indistinguishable:

$\{(q. \mathbb{G}, \mathbb{H}, \mathbb{G}_T, e) \leftarrow \text{BilinSetup}(1^\lambda): g \leftarrow \mathbb{G}; a, b \leftarrow \mathbb{Z}_q: (q: \mathbb{G}, \mathbb{H}, \mathbb{G}_T; e: g, g^a, g^b, g^{ab})\} \overset{c}{\approx}$
$\{(q. \mathbb{G}, \mathbb{H}, \mathbb{G}_T, e) \leftarrow \text{BilinSetup}(1^\lambda): g \leftarrow \mathbb{G}; a, b, c \leftarrow \mathbb{Z}_q: (q: \mathbb{G}, \mathbb{H}, \mathbb{G}_T; e, g: g^a: g^b, g^c)\}$ and a similar statement when $g \in \mathbb{G}$ is replaced with $h \in \mathbb{H}$. In contrast, the assumption that DDH is hard in one of the two groups $\mathbb{G}$ or $\mathbb{H}$ is simply called the external Diffie-Hellman assumption (XDH).

III.E.2. Collusion-Resistant Functional Re-Encryption

This section presents the construction of the functional re-encryption program from the symmetric external Diffie-Hellman (SXDH) assumption. First, the basic encryption scheme is set forth. Second, the details of the functional re-encryption program are discussed.

III.E.2.a. Construction of the Encryption Schemes

In general, a functional re-encryption program transforms a ciphertext under an input public key into a ciphertext of the same message under one of many output public keys. In some embodiments, the input and the output ciphertexts have different shapes. In other words, the input ciphertext lives in the "source group" $\mathbb{G}$ whereas the output ciphertext lives in the "target group" $\mathbb{G}$ T. The input and output encryption schemes will now be discussed.

Parameters

The public parameters for both the input and the output encryption includes the description of three groups $\mathbb{G}$, $\mathbb{H}$ and $\mathbb{G}_T$ of prime order $q = q(\lambda)$, with a bilinear map, $$e: \mathbb{G} \times \mathbb{H} \to \mathbb{G}_T.$$

Also included in the public parameters are two generators, $g \in \mathbb{G}$ and $h \in \mathbb{H}$. Let, $\mathcal{M} = \mathcal{M}(\lambda) \subseteq \mathbb{G}$ denote the message space of both the input and output encryption. It is assumed that $|\mathcal{M}|$ is polynomial in $\lambda$.

Input Encryption

The input encryption is parameterized by numbers $d=d(\lambda)$ and $n=n(\lambda)$. These are upper bounds on the size of the domain and the range of the policy function that is supported. Throughout this discussion, it is assumed that $d \geq n$. Moreover, a NIZK proof system is used because it provides a efficient scheme for the type of statements used herein, which is perfectly sound and computationally zero-knowledge based on SXDH.

First, I-Gen($1^\lambda, 1^d, 1^n$). The program picks random vectors $a_1, \ldots, a_d$, from $\mathbb{Z}_q^d$. In addition, the program generates a CRS, which is a CRS for the NIZK proof system. The output is a public key, pk, and a private (or secret) key, sk. Here, pk=(CRS, g, $g^{a_1}, \ldots g^{a_d}$), and sk=($a_1, \ldots, a_d$). It should be noted that pk can be viewed as being made up of d public keys $pk_i=(g, g^{a_i})$ of a simpler scheme.

Second, I-Enc(pk, i $\in$ [d], m). In order to encrypt a message $m \in \mathcal{M}$, with "identity" $i \in [d]$, the program selects random exponents r and r' from $\mathbb{Z}_q^d$, and compute the following:

(a) $C=g^{ra_i}$; $D=g^r m$, and
$C'=f^{r'a_i}$; $D'=g^{r'}$ (c) $\pi$, a proof that these values are correctly formed. In other words, that they correspond to one of the vectors $g^{a_1}$ contained in the public key pk.

The ciphertext (E, E', $\pi$) is output, where E=(C, D) and E'=(C', D'). Note that E looks like an encryption of message m under $pk_i$, while E' looks like an encryption of 0 under $pk_i$. E' is used only by the re-encryption program for input re-randomization, and is ignored by the decryption technique I-Dec.

Third, I-Dec(sk, (E, E')). If any of the components of the ciphertext E' is $1_\mathbb{G}$ or if the proof $\pi$ does not verify, then output $\bot$. This is a check to ensure the security of the re-encryption program. Note that if (E, E') is honestly generated, this event happens only with negligible probability.

The program then ignores E', $\pi$ subsequently, and then parses E as (C, D). Then the program checks that for some $i \in$ [d] and $m \in \mathcal{M}$, $$D \cdot (C^{1/a_i})^{-1} = (m, \ldots, m).$$

If yes, then the program outputs (i, m). Otherwise, it outputs $\bot$.

Output Encryption

The output encryption is described as follows:

First, O-Gen($1^\lambda$). The program picks $\hat{a} \leftarrow \mathbb{Z}_q$. Let $\widehat{pk} = h^{\hat{a}}$ and $\widehat{sk} = \hat{a}$.

Second, O-Enc($\widehat{pk}$, m). The program encrypts a message, $m \in \mathcal{M} \subset \mathbb{G}_1$, as follows:

(a) Choose random numbers r, s $\leftarrow \mathbb{Z}_q$.
(b) Compute $\hat{Y}=(h^{\hat{a}})^r$ and $\hat{W}=h^r$.
(c) Output the ciphertext as.

$$[\hat{F}, \hat{G}, \hat{H}] := [e(g^s, \hat{Y}), e(g^s, \hat{W}) \cdot e(m, h^s), h^s].$$

Third, O-Dec ($\widehat{sk} = \hat{a}$, ($\hat{F}, \hat{G}, \hat{H}$)). The decryption technique does the following:

(a) Computes $\hat{Q}=\hat{G}\cdot\hat{F}^{-1/\hat{a}}$,

For each m∈ $\mathcal{M}$, test whether e(m, $\hat{H}$)=$\hat{Q}$. If so, then output m and halt.

III.E.2.b. Obfuscation for Functional Re-Encryption

The technique for securely obfuscating the functional re-encryption functionality for the input and output encryption techniques described above will now be discussed.

Functional Re-Encryption Key

The functional re-encryption program obtains an input secret key Sk, the n output public keys $\widehat{pk}_i$, and the description of a function F: [d]→[n]. It outputs a functional re-encryption key which is a description of a program that takes as input a ciphertext of message m∈ $\mathcal{M}$ under public key pk, with Identity i∈ [d], outputs a ciphertext of m under $\widehat{pk}$ F(i).

The functional re-encryption program does the following:
(a) Picks $z \leftarrow \mathbb{Z}_q$ and $w_i \leftarrow \mathbb{Z}_q$ for all i∈ [d] uniformly at random.
(b) Solves for $\alpha=(\alpha_1, \ldots, \alpha_d)$ and $\beta=(\beta_1, \ldots, \beta_d)$ such that for all i∈ [d], $\langle a_i, \alpha \rangle = w_i \cdot \hat{a}_{F(i)}$, and $\langle a_i, \beta \rangle = w_i - 1$.

The re-encryption key consists of the tuple (Z, A, B) where $Z=h^z$, $A=h^{z\alpha}$, and $B=h^{z\beta}$. It should be noted that computing the re-encryption key does not require the knowledge of the output secret keys.

Functional Re-Encryption Program

Given the functional re-encryption key (Z, A, B) and an input ciphertext (E, E'), where E=(C, D) and E'=(C', D'), the functional re-encryption program performs the following steps:

(1) Sanity check. Specifically, if any of the components of the input ciphertext E' is $1_\mathbb{G}$ or if the proof π does not verify, output ($\hat{F}, \hat{G}, \hat{H}$) for random$\hat{F}, \hat{G} \in \mathbb{G}_T$ and random $\hat{H} \in \mathbb{H}$. The sanity check is to ensure that the next step (input re-randomization) randomizes the ciphertext E.

(2) Input Re-Randomization. The program picks a random exponent $t \leftarrow \mathbb{Z}_q$ and computes $\hat{C}=C(C')^t$ and $\hat{D}=D(D')^t$. Note that the random exponent t is used to re-randomize the encryption of 0, and this re-randomized encryption of 0 is multiplied with the encryption of a) to obtain a re-randomized encryption of m.

(3) The main Re-Encryption step. The program writes,
$\hat{C}:=(\hat{C}_1, \ldots, \hat{C}_d)$,
$A:=(A_1, \ldots, A_d)$, and
$B:=(B_1, \ldots, B_d)$.
Then it computes, $$F = \prod_{j=1}^{d} e(\hat{C}_j, A_j), \text{ and}$$

$$G = \prod_{j=1}^{d} e(\hat{C}_j, B_j) \cdot e(\hat{D}, Z)$$

(4) Output Re-randomization. The program then selects a random exponent $s \leftarrow \mathbb{Z}_q$ and computes $\hat{F}=F^s$, $\hat{G}=G^s$, and $\hat{H}=H^s$. The program then outputs the ciphertext ($\hat{F}, \hat{G}, \hat{H}$).

Preserving Functionality

Let the input ciphertext be (C, D, C', D', π). Given that π verifies, it is known that these values will be of the form $C=g^{ra_i}$, $D=g^r m$, and $C'=g^{r'a_i}$, $D'=g^{r'}$. Let the re-encryption key be given as (Z, A, B), where $Z=h^z$, $A=h^{z\alpha}$, and $B=h^{z\beta}$.

First, the input re-randomization step computes, $\hat{C}=C(C')^t=g^{(r+tr')a_i}=g^{\hat{r}a_i}$, and $\hat{D}=D(D')^t=g^{r+tr'}m=g^{\hat{r}}m$, where, $\hat{r} \triangleq r+tr'$.

Second, the main re-encryption step computes, $$F = \prod_{j=1}^{d} e(\hat{C}_j, A_j)$$

$$= e(g, h)^{\hat{r}z\langle a_i, \alpha \rangle}$$

$$= e(g, h)^{\hat{r}zw_i \hat{a}_{F(i)}}, \text{ and}$$

$$G = \prod_{j=1}^{d} e(\hat{C}_j, B_j) \cdot e(\hat{D}, Z)$$

$$= e(g, h)^{\hat{r}z\langle a_i, \beta \rangle} \cdot e(g^{\hat{r}}m, h^z)$$

$$= e(g, h)^{\hat{r}z(w_i-1)} \cdot e(g^{\hat{r}}, h^z) \cdot e(m, h^z)$$

$$= e(g, h)^{\hat{r}zw_i} \cdot e(m, h^z).$$

After the output re-randomization step (using randomness S), the ciphertext looks like $\hat{F}=e(g^\sigma, h^{\alpha_{F(i)\rho}})$, $\hat{G}=e(g^\sigma, h^\rho) \cdot e(m, h^\sigma)$, and $\hat{H}=h^\sigma$, where $\rho=\hat{r}w_i$ and $\sigma=sz$ are both uniformly random in $\mathbb{Z}_q$, even given all the randomness in the input ciphertext. The claim about ρ being uniformly random crucially relies on the "sanity check" step in re-encryption. Thus, the final ciphertext is distributed exactly like the output of O-Enc($\widehat{pk}_{F(i)}$, m).

IV. Exemplary Operating Environment

Figure 7:
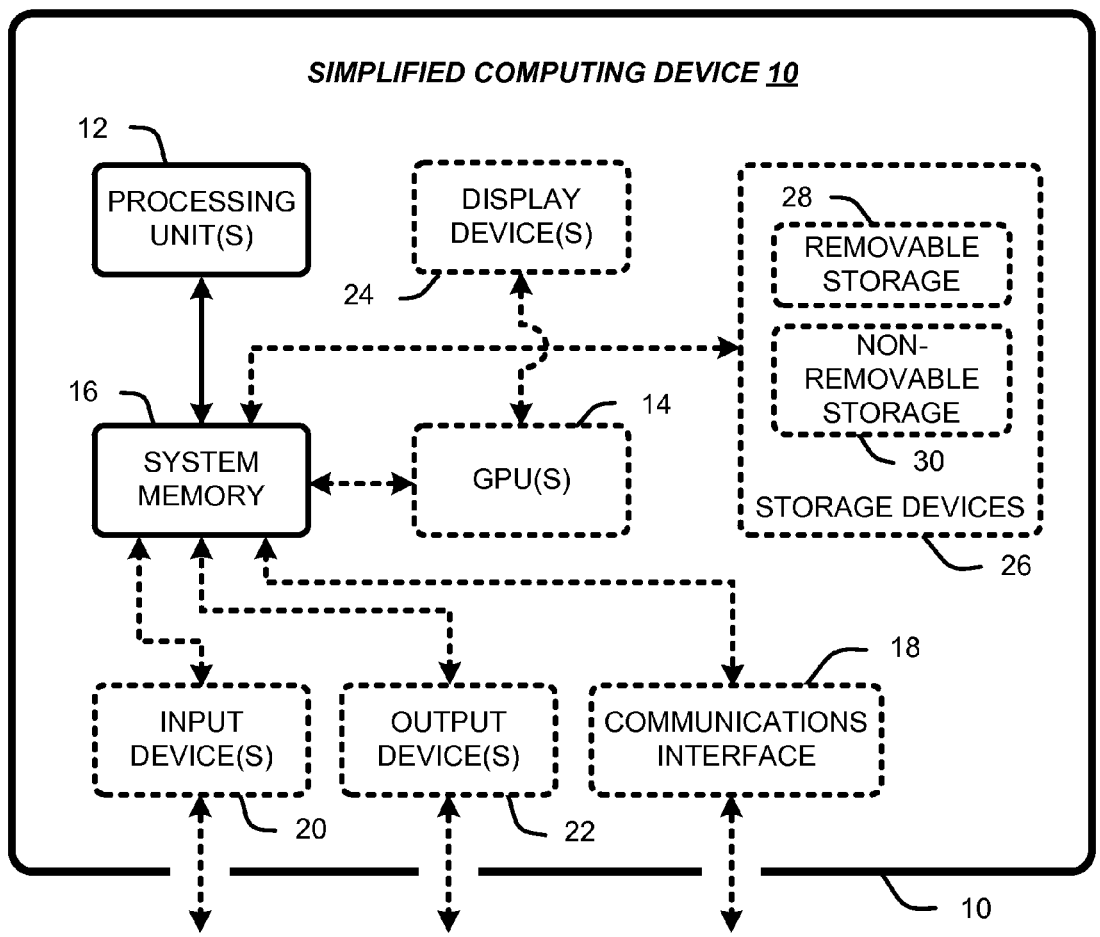
FIG. 7 illustrates a simplified example of a general-purpose computer system on which various embodiments and elements of the obfuscated policy data encryption system and method, as described herein and shown in FIGS. 1-6, may be implemented.

Embodiments of the obfuscated policy data encryption system 100 and method described herein are operational within numerous types of general purpose or special purpose computing system environments or configurations. FIG. 7 illustrates a simplified example of a general-purpose computer system on which various embodiments and elements of the obfuscated policy data encryption system 100 and method, as described herein and shown in FIGS. 1-6, may be implemented. It should be noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

For example, FIG. 7 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement embodiments of the obfuscated policy data encryption system 100 and method described herein, the device should have a sufficient computational capability and system memory to enable basic computational operations. In particular, as illustrated by FIG. 7, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 7 may also include other components, such as, for example, a communications interface 18. The simplified computing device of FIG. 7 may also include one or more conventional computer input devices 20 (e.g., pointing devices, keyboards, audio input devices, video input devices, haptic input devices, devices for receiving wired or wireless data transmissions, etc.). The simplified computing device of FIG. 7 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 7 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the obfuscated policy data encryption system 100 and method described herein, or portions thereof, may be stored, received, transmitted, or read from any desired combination of computer or machine readable media or storage devices and communication media in the form of computer executable instructions or other data structures.

Finally, embodiments of the obfuscated policy data encryption system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices, the method comprising:
   receiving an obfuscated policy at a cloud data management system, the obfuscated policy being a private version of a data-sharing policy specified by a user, the data-sharing policy regarding access by one or more data consumers to data about the user;
   receiving an obfuscated re-encryption program at the cloud data management system, the obfuscated re-encryption program having been generated using a private key of the user, a data consumer public key of an individual data consumer, and the obfuscated policy, wherein the cloud data management system does not have access to the private key of the user;
   receiving encrypted data at the cloud data management system from a data provider, the encrypted data being raw data about the user that has been encrypted using a user public key of the user;
   re-encrypting the encrypted data using the obfuscated re-encryption program and the obfuscated policy to obtain re-encrypted data;
   storing the re-encrypted data in the cloud data management system;
   receiving a modified obfuscated policy at the cloud data management system;
   receiving a modified obfuscated re-encryption program at the cloud data management system, the modified obfuscated re-encryption program having been generated using the private key of the user, the data consumer public key of the individual data consumer, and the modified obfuscated policy;
   receiving additional encrypted data from the data provider; and
   re-encrypting the additional encrypted data using the modified obfuscated re-encryption program instead of the obfuscated re-encryption program.

2. The method of claim 1, wherein the user public key of the user and the private key of the user are generated together.

3. The method of claim 1, further comprising:
receiving a request for a portion of the re-encrypted additional encrypted data from the individual data consumer; and
sending the portion of the re-encrypted additional encrypted data to the individual data consumer.

4. The method of claim 3, wherein the portion of the re-encrypted additional encrypted data is sent to the individual data consumer as a ciphertext that is readable only with another private key of the individual data consumer.

5. The method of claim 3, wherein the ciphertext is only readable by the individual data consumer by decrypting the ciphertext using another private key of the individual data consumer to obtain decrypted data.

6. The method of claim 1, wherein the data about the user includes medical record data, and the one or more data consumers are health care providers.

7. A computer readable memory device or storage device storing computer readable instructions that, when executed by one or more computing devices, cause the one or more computing devices to perform acts comprising:
obtaining an obfuscated policy at a cloud data management system, the obfuscated policy being a private version of a data-sharing policy specified by a user, the data-sharing policy specifying access by data consumers to data about the user;
obtaining an obfuscated re-encryption program at the cloud data management system, the obfuscated re-encryption program having been generated using a private key of the user, a public key of an individual data consumer, and the obfuscated policy, wherein the one or more computing devices do not have access to the private key of the user;
receiving encrypted data at the cloud data management system from a data provider, the encrypted data being raw data about the user that has been encrypted using a user public key of the user;
re-encrypting the encrypted data using the obfuscated re-encryption program and the obfuscated policy to obtain re-encrypted data;
storing the re-encrypted data at the cloud data management system;
obtaining a modified obfuscated policy at the cloud data management system;
obtaining a modified obfuscated re-encryption program at the cloud data management system, the modified obfuscated re-encryption program having been generated using the private key of the user, the public key of the individual data consumer, and the modified obfuscated policy; and
using the modified obfuscated re-encryption program for a subsequent re-encryption instead of the obfuscated re-encryption program.

8. The computer readable memory device or storage device of claim 7, wherein the data provider is not the user.

9. The computer readable memory device or storage device of claim 7, wherein the data provider is one of the data consumers.

10. The computer readable memory device or storage device of claim 7, wherein the obfuscated re-encryption program is generated using multiple public keys of multiple data consumers.

11. The computer readable memory device or storage device of claim 7, wherein the obfuscated policy specifies a portion of the encrypted data that is accessible to the individual data consumer.

12. The computer readable memory device or storage device of claim 7, the acts further comprising:
receiving additional encrypted data from the data provider, and
performing the subsequent re-encryption on the additional encrypted data.

13. The computer readable memory device or storage device of claim 7, the acts further comprising obtaining the obfuscated re-encryption program from another computing device that is associated with the user.

14. The computer readable memory device or storage device of claim 7, wherein the re-encrypting is performed by the cloud data management system.

15. The computer readable memory device or storage device of claim 7, the acts further comprising obtaining the obfuscated policy from another computing device that is associated with the user.

16. A cloud computing system, comprising:
a computing device; and
a storage device storing computer-executable instructions which, when executed by the computing device, cause the computing device to:
obtain an obfuscated version of a data-sharing policy specified by a user, the data-sharing policy specifying an extent of access by data consumers to data about the user,
obtain an obfuscated re-encryption program having been generated using a private key of the user, public keys of the data consumers, and the obfuscated version of the data-sharing policy specified by the user, wherein the cloud computing system does not have access to the private key of the user,
receive encrypted data from a data provider, the encrypted data being some of the data about the user that has been encrypted using a user public key of the user,
re-encrypt the encrypted data using the obfuscated re-encryption program and the obfuscated version of the data-sharing policy to obtain re-encrypted data,
store the re-encrypted data,
provide the re-encrypted data to the data consumers in accordance with the obfuscated version of the data-sharing policy,
obtain a modified obfuscated policy,
obtain a modified obfuscated re-encryption program having been generated using the private key of the user, another public key of another data consumer, and the modified obfuscated policy, and
use the modified obfuscated re-encryption program for a subsequent re-encryption instead of the obfuscated re-encryption program.

17. The cloud computing system of claim 16, wherein the obfuscated re-encryption program is generated by another computing device that is not part of the cloud computing system.

18. The cloud computing system of claim 16, wherein the subsequent re-encryption is performed on the encrypted data.

19. The cloud computing system of claim 16, wherein the computer-executable instructions further cause the computing device to store the re-encrypted data in an electronic medical records system.

20. The cloud computing system of claim 16, wherein the computer-executable instructions further cause the computing device to provide an anonymized version of a portion of the data about the user to an individual data consumer in accordance with the obfuscated re-encryption program.

* * * * *